United States Patent
Wager et al.

(10) Patent No.: US 9,432,105 B2
(45) Date of Patent: Aug. 30, 2016

(54) SUB-CARRIER ALLOCATION IN A WIRELESS COMMUNICATION SYSTEM USING RELAYS

(75) Inventors: Stefan Wager, Espoo (FI); Christian Hoymann, Aachen (DE); Bengt Lindoff, Bjärred (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 14/125,261

(22) PCT Filed: Jun. 13, 2011

(86) PCT No.: PCT/SE2011/050720
§ 371 (c)(1),
(2), (4) Date: Dec. 10, 2013

(87) PCT Pub. No.: WO2012/173530
PCT Pub. Date: Dec. 20, 2012

(65) Prior Publication Data
US 2014/0133387 A1     May 15, 2014

(51) Int. Cl.
*H04B 7/15* (2006.01)
*H04L 5/00* (2006.01)
(Continued)

(52) U.S. Cl.
CPC .......... *H04B 7/15* (2013.01); *H04L 5/003* (2013.01); *H04W 72/1289* (2013.01); *H04W 84/047* (2013.01)

(58) Field of Classification Search
CPC .......... H04B 7/14; H04B 7/145; H04B 7/15; H04B 7/15528; H04B 7/15542; H04W 84/047; H04W 72/1289; H04W 72/1278; H04L 5/003
See application file for complete search history.

(56) References Cited

U.S. PATENT DOCUMENTS

| | | | |
|---|---|---|---|
| 2011/0051654 A1 | 3/2011 | Blankenship et al. | |
| 2011/0103295 A1* | 5/2011 | Khandekar | H04W 72/04 370/315 |
| 2011/0194484 A1* | 8/2011 | Lee | H04B 7/155 370/315 |

(Continued)

FOREIGN PATENT DOCUMENTS

| WO | 2011005787 A1 | 1/2011 |
|---|---|---|
| WO | 2011029469 A1 | 3/2011 |

OTHER PUBLICATIONS

Fang-Ching Ren et al.—"Recommendation on PMP Mode Compatible TDD Frame Structure", Document No. IEEE C802.16MMR-05/027R1, Sep. 9, 2005, pp. 1-16, XP002575192, Retrieved from the Internet at URL:http:/www.ieee802.org/16/sg/mmr/contrib/C8026mmr-05_027r1.pdf [retrieved on Mar. 18, 2010] pp. 7,8 consisting of 16-pages.

(Continued)

*Primary Examiner* — Hoang-Chuong Vu
(74) *Attorney, Agent, or Firm* — Christopher & Weisberg, P.A.

(57) ABSTRACT

Exemplifying embodiments herein relate to a relay node and a method therein for communicating data to a user equipment, the relay node being associated with a base station, is provided. The method comprises receiving information from the base station indicating a first set of resource blocks of a subframe comprising control information. The method further comprises identifying, based on the received information, at least one resource block outside said first set of resource blocks, and scheduling, to the user equipment, transmissions on the at least one identified resource block.

18 Claims, 9 Drawing Sheets

(51) Int. Cl.
*H04W 72/12* (2009.01)
*H04W 84/04* (2009.01)

(56) References Cited

U.S. PATENT DOCUMENTS

| | | | | |
|---|---|---|---|---|
| 2011/0222428 A1* | 9/2011 | Charbit | ............. | H04B 7/15557 370/252 |
| 2011/0243059 A1* | 10/2011 | Liu | ...................... | H04L 1/0046 370/315 |
| 2011/0243060 A1* | 10/2011 | Mildh | ................ | H04B 7/15542 370/315 |
| 2011/0310789 A1* | 12/2011 | Hu | ...................... | H04L 5/0005 370/315 |
| 2012/0002593 A1* | 1/2012 | Kim | ..................... | H04L 1/1854 370/315 |
| 2012/0140702 A1* | 6/2012 | Takano | ................ | H04B 7/2606 370/315 |
| 2012/0230245 A1* | 9/2012 | Ostergaard | ........ | H04W 72/0426 370/315 |
| 2012/0250603 A1* | 10/2012 | Huang | ............. | H04W 72/1257 370/315 |
| 2013/0242855 A1* | 9/2013 | Kim | ..................... | H04J 11/005 370/315 |

OTHER PUBLICATIONS

Huawei: "R-PDCCH Design", 3GPP TSG RAN WG1 Meeting #58 Draft; R1-093042 R-PDCCH Design, 3rd Generation Partnership Project (3GPP), Mobile Competence Centre; 650, Route des Lucioles; F-06921 Sophia-Antipolis Cedex; France, No. Shenzhen, China; Aug. 24-28, 2009, XP050351434, [retrieved on Aug. 18, 2009] p. 1, lines 13-14, paragraph 2, line 2, p. 3, lines 8-10 and 20-22 consisting of 6-pages.

Qualcomm Incorporated: "Message Structure for Relay Configuration", 3GPP_TSG-RAN_WG2_Meeting #71_R2-104900, Mobile Competence Centre; 650, Route des Lucioles; F-06921 Sophia-Antipolis Cedex; France, vol. RAN WG2, No. Madrid, Spain; Aug. 23, 2010, XP050452017, [retrieved on Aug. 17, 2010] paragraph 2.2 consisting of 4-pages.

3GPP_TR_36.912 "3rd Generation Partnership Project; Technical Specification Group Radio Access Network; Feasibility Study for Further Advancements for E-UTRA (LTE-Advanced) (Release 10)", 3GPP Standard; 3rd Generation Partnership Project (3GPP), Mobile Competence Centre; 650, Route des Lucioles; F-06921 Sophia-Antipolis Cedex; France, No. V10.0.0, Mar. 29, 2011, pp. 1-62, XP050476525, [retrieved on Mar. 29, 2011] paragraph 9 consisting of 62-pages.

3GPP_TSG_RAN_WG2_Meeting #73bis, R2-111836 CATT: "PDSCH Transmission in unused MBSFN Subframes", 3GPP Draft; 3rd Generation Partnership Project (3GPP), Mobile Competence Centre; 650, Route des Lucioles; F-06921 Sophia-Antipolis Cedex; France, vol. RAN WG2, No. Shanghai, China, Apr. 11, 2011, XP050494221, [retrieved on Apr. 3, 2011] paragraphs 1 and 2 consisting of 4-pages.

3GPP TS 36.216 V10.2.0 (Mar. 2011) 3rd Generation Partnership Project; Technical Specification Group Radio Access Network; Evolved Universal Terrestrial Radio Access (E-UTRA); Physical layer for relaying operation (Release 10) consisting of 16-pages.

International Search Report and Written Opinion dated Mar. 27, 2012 for International Application No. PCT/SE2011/050720; International Filing Date: Jun. 13, 2011 consisting of 25-pages.

* cited by examiner

SUB-CARRIER ALLOCATION IN A WIRELESS COMMUNICATION SYSTEM USING RELAYS

TECHNICAL FIELD

Embodiments herein relate generally to sub-carrier allocation in a wireless communication system, and in particular to sub-carrier allocation with respect to a relay node being associated with a base station.

BACKGROUND

A wireless communication network typically comprises of a number of different cells. Each cell comprises a base station which has the covering area of the cell. Different cells may have very different characteristics. Some cells are in cities, comprising buildings of different heights and other cells are in the countryside comprising open fields or trees or bushes. Some cells are relatively small and some cells are relatively large. Further, the number of users in each cell may vary dramatically depending on the type of cell and on the movement of users. Typically, some cells have "weak spots" where the radio coverage is poor. Certain cells have spots with a high concentration of users resulting in high demand on resources in the cell. In order to improve the radio coverage or to support a great number of users at a certain location, relay stations may be used. Relay stations provide increased radio coverage of a certain area within a cell, and/or increased capacity in the certain area within the cell.

An example of such a solution with a relay node to increase radio coverage or capacity is schematically illustrated in FIG. 1a. FIG. 1 illustrates a base station 100 having a coverage area illustrated by a dotted oval. Within the cell or at least overlapping with the cell is a relay node 140 having a smaller coverage area also illustrated by a smaller dotted oval. The relay node provides services to a user equipment 190 located within the cell, or coverage area, of the relay node 140.

Relaying support is added in the Release 10 (Rel-10) version of the third Generation Partnership Project (3GPP) related to LTE specification. The solution is a layer 3 relay, which means that all radio protocols (layers 1-3) are terminated in the relay node. User equipments connect to the relay node over standard Uu interface, meaning that backwards compatibility with Rel-8 UEs is achieved. From a user equipment perspective, the relay node looks like an ordinary eNodeB, eNB. The relay node has no fixed backhaul, but connects wirelessly to a donor cell using the Un interface. The donor cell is controlled by a Donor eNB (DeNB) and is based on Uu protocols, with some modifications. The DeNB also serves user equipments connected directly to it.

One challenge for relays is to overcome different interference issues. One type of interference is self-interference, where a transmitted signal from a relay node interferes with a received signal from the DeNB, see FIG. 1b. In FIG. 1b, it is illustrated that in case a relay station 140 transmits a signal to a user equipment 190 simultaneously as it receives a signal from the base station 100, the two signals interfere with each other. The result may be that data comprised in the signal received from the base station 100 in the relay node 140 will be so greatly interfered with that the data is lost for the relay node 140.

Two different types of relaying are defined; outband and inband relaying. With outband relaying, the Uu and Un operates on different frequencies allowing continuous transmission on both links without self-interference issues. With inband relaying, Uu and Un interfaces share on the same frequency, but time multiplexing is introduced to avoid self-interference issues.

Time multiplexing for inband relaying is achieved by coordinating the scheduling of Un and Uu interfaces so that they do not occur at the same time. The DeNB configures the relay node with a Un subframe configuration, which informs the relay node of which subframes that may be used for Un transmission and which may be used for Uu transmission. Correspondingly, the relay node configures its user equipments with a Rel-8 defined Multi-Media Broadcast over Single Frequency Network (MBSFN) configuration to ensure that user equipments do not expect reference symbols transmitted by the relay node on Un subframes.

In LTE, specific MBSFN subframes are introduced to enable multi-cast transmission to the UEs being configured to receive such a service. In Rel-8/9, the UEs that are not configured to receive multi-cast transmission, receive only Physical Downlink Control CHannel (PDCCH) in the beginning of the MBSFN subframe. PDCCH may carry an uplink grant for a future subframe. In LTE Rel-10, a new transmission mode, Mode 9, is introduced. In this transmission mode, the UEs may receive also on Physical Downlink Shared CHannel (PDSCH) in a MBSFN subframe.

Since the three first time slots of MBSFN subframes may be used to transmit PDCCH from RN to UEs, it will not be possible for the relay node to simultaneously receive PDCCH from DeNB without significant self-interference. Therefore, 3GPP has specified a new R-PDCCH in Rel-10, which is used to carry downlink scheduling assignments and uplink grants from the DeNB to the relay node. In the time domain, R-PDCCH transmission starts in symbol #3 to avoid time with PDCCH transmissions from the relay node in symbols #0, #1 and #2. The frequency domain of R-PDCCH is semi-statically configured via Radio Resource Control (RRC), so that the relay node knows in advance in which frequency domain the R-PDCCH will be transmitted.

The solution for achieving inband operation through Un configuration has some characteristics when it comes to the sharing the radio resources between the two links. In particular, if it has to be guaranteed that no self-interference is caused from the Uu link to the Un link, then no transmission may take place on the Uu link if there is a possibility that there might be data on the Un link.

The above characteristics mean that the sharing of resources between Un and Uu follow a certain granularity and limitations. In case of temporal change in traffic load between the relay node and user equipments being served by the relay node, the relay node may not be able to support the increase in traffic load. This may lead to discarding of traffic resulting in users not being able to use their user equipments as desired. It may also cause loss of revenue to the operator of the wireless network.

SUMMARY

It is an object of the exemplifying embodiments to address at least some of the problems outlined above. In particular, it is an object of the exemplifying embodiments to provide a relay node and a method therein for communicating data to a user equipment, the relay node being associated with a base station, wherein a downlink transmission to the user equipment is scheduled on resource block(s) available to the base station. These objects and others may be obtained by providing a relay node and a method in a relay node according to the independent claims attached below.

According to an aspect a method in a relay node for communicating data to a user equipment, the relay node being associated with a base station, is provided. The method comprises receiving information from the base station indicating a first set of resource blocks of a subframe comprising control information. The method further comprises identifying, based on the received information, at least one resource block outside said first set of resource blocks, and scheduling, to the user equipment, transmissions on the at least one identified resource block. The method further comprising receiving a transmission from the base station comprising control information, determining from said control information whether a first data was received in the transmission from the base station on said identified at least one resource block, and if a second data was transmitted simultaneously to said user equipment on the identified at least one resource block. The method further comprising requesting retransmission from the base station of said first data.

According to an aspect, a relay node is configured to communicate data to a user equipment, the relay node being associated with a base station, is provided. The relay node is configured to receive information from the base station indicating a first set of resource blocks of a subframe comprising control information. The relay node is further configured to identify, based on the received information, at least one resource block outside the first set of resource blocks; and to schedule, to the user equipment, transmissions on the at least one identified resource block. The relay node further configured to receive a transmission from the base station comprising control information and determine from said control information whether a first data was received in said transmission from the base station on said identified at least one resource block, and if second data was transmitted simultaneously to the user equipment on said identified at least one resource block. The relay node further configured to request retransmission from the base station of said first data.

According to an aspect, a method in a base station associated with a relay node, for controlling resource reservation of the relay node is provided. The method comprises reserving a first set of resource blocks out of a set of resource blocks in a subframe, to transmit data to the relay node, and reserving a second set of resource blocks out of the set of resource blocks in the subframe, for enabling the relay node to schedule transmissions to a user equipment being served by the relay node. The method further comprises informing the relay node about the reserved first and second set of resource blocks.

According to an aspect, a base station, associated with a relay node, the base station being configured to control resource reservation of the relay node, is provided. The base station is configured to reserve a first set of resource blocks out of a set of resource blocks in a subframe for transmission of data to the relay node; and to reserve a second set of resource blocks out of the set of resource blocks in the subframe for enabling the relay node to schedule transmissions to a user equipment being served by the relay node. The base station is further configured to inform the relay node about the reserved first and second set of resource blocks.

The relay node and the method therein, as well as the base station and the method therein, have several advantages. A resource block in a subframe possibly not comprising data in transmissions from the base station, i.e. not being used by the base station, will not be wasted. Instead better use of the resources is achieved. This will lead to increased spectrum efficiency.

In this manner, it is possible to virtually change the split between the resource blocks in a subframe reserved for the base station and the resource blocks in the subframe reserved for the relay node in a dynamic manner. How much resources to allocate to each interface may change over time depending on the load between the base station and the relay station versus the load between the relay node and user equipments being served by the relay node. One scenario where the capacity between the relay node and the user equipments may need to be temporarily increased is data caching in the relay node. This means that frequently used data is cached in the relay node for fast access from user equipments under the relay node. In this case, the relay node may temporarily assign all resources to the interface between the relay node and the user equipments, as the data already exists in its buffer and no or little resources are needed on the interface between the base station and the relay station

BRIEF DESCRIPTION OF DRAWINGS

Embodiments will now be described in more detail in relation to the accompanying drawings, in which.

DETAILED DESCRIPTION

Briefly described, exemplifying embodiments of a method in a relay node, a method in a base station, a relay node and a base station are provided for communicating data to a user equipment. The communication of data is performed by the base station reserving a first set of resource blocks out of a set of resource blocks in a subframe for the base station to transmit data to the relay node; and a second set of resource blocks out of the set of resource blocks in the subframe for the relay node to transmit data to a user equipment. Then the relay node schedules transmissions of data to the user equipment in relation to the first and the second set of resource blocks.

Figure 2A:
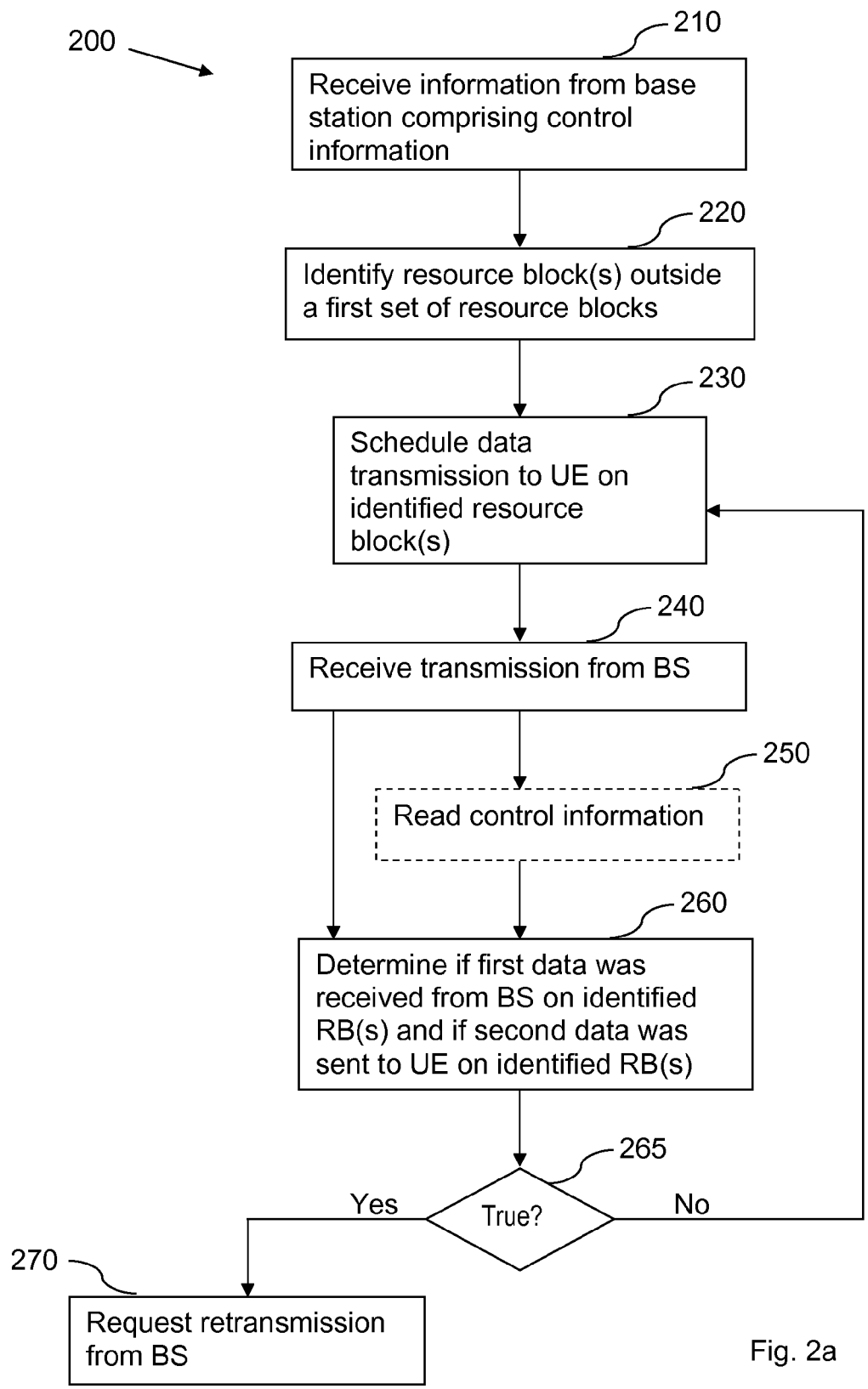
FIG. 2a is a flowchart illustrating an exemplifying embodiment of a method in a relay node for communicating data to a user equipment.

An exemplifying embodiment of such a method in a relay node for communicating data to a user equipment will now be described with reference to the flowchart in FIG. 2a, the relay node being associated with a base station. In this embodiment, the method 200 comprises receiving 210 information from the base station indicating a first set of resource blocks of a subframe comprising control information; and identifying 220, based on the received information, at least one resource block outside the first set of resource blocks. The method further comprises scheduling 230, to the user equipment, transmissions on the at least one identified resource block.

In this embodiment, the relay node receives 210 information from the base station indicating a first set of resource blocks of a subframe potentially comprising control information. In case the base station schedules data to the relay node, then the control information is present. In case the base station does not schedule data to the relay node, no control information is present. The relay node identifies 220 at least one resource block outside the first set of resource blocks based on the received information. The first set of resource blocks is reserved for the base station to transmit data to the relay node. However, all the resource blocks in the first set of resource blocks may or may not be used be the base station in every subframe. In case the base station does not have any data, or only has little amount of data, to send to the relay node, one or more of the resource blocks in the first set of resource blocks reserved for the base station may remain un-used by the base station. By identifying at least one resource block reserved for the base station, and scheduling 230 transmissions, to the user equipment, on the at least one identified resource block, such a possibly un-used resource block(s) may be used by the relay station to transmit data to the user equipment.

This has several advantages. A resource block in a subframe possibly not comprising data in transmissions from the base station, i.e. not being used by the base station, will not be wasted. Instead better use of the resources is achieved. This will lead to increased spectrum efficiency.

In this manner, it is possible to virtually change the split between the resource blocks in a subframe reserved for the base station and the resource blocks in the subframe reserved for the relay node in a dynamic manner. How much resources to allocate to each interface may change over time depending on the load between the base station and the relay station versus the load between the relay node and user equipments being served by the relay node. One scenario where the capacity between the relay node and the user equipments may need to be temporarily increased is data caching in the relay node. This means that frequently used data is cached in the relay node for fast access from user equipments under the relay node. In this case, the relay node may temporarily assign all resources to the interface between the relay node and the user equipments, as the data already exists in its buffer and no or little resources are needed on the interface between the base station and the relay station.

According to an embodiment, the method 200 in the relay node further comprises receiving 240 a transmission from the base station comprising control information; and determining 260 from the control information whether a first data was received in the transmission from the base station on the identified at least one resource block, and if second data was transmitted simultaneously to the user equipment on the identified at least one resource block. The method further comprises requesting 270 retransmission from the base station of the first data.

When a transmission, comprising control information, is received 240 from the base station, the relay node determines 260 whether the base station has used the identified at least one resource block to transmit first data to the relay node; and if so, if second data was transmitted simultaneously to the user equipment on the identified at least one resource block. If this has happened, the data that was received from the base station was lost, due to self interference as the transmitted signal from the relay node interferes with the received signal from the base station. In such a case, the relay node requests 270 retransmission of the first data from the base station.

This way, it is safeguarded that in case the relay node schedules a transmission to the user equipment on a resource block or blocks reserved for the base station, and the base station actually does use the resource block or blocks, then the data will not be un-recoverably lost, but instead received in a re-transmission from the base station.

Figure 2B:
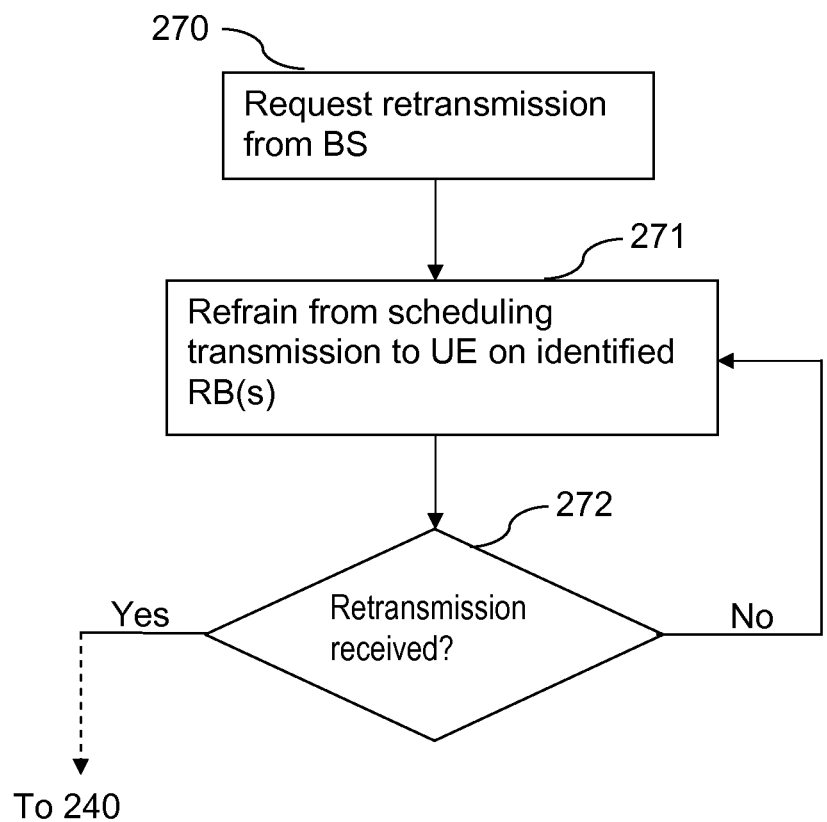
FIG. 2b is a flowchart illustrating yet an exemplifying embodiment of a method in a relay node for communicating data to a user equipment.

FIG. 2b is a flowchart illustrating yet an exemplifying embodiment of a method in a relay node for communicating data to a user equipment.

Figure 1A:
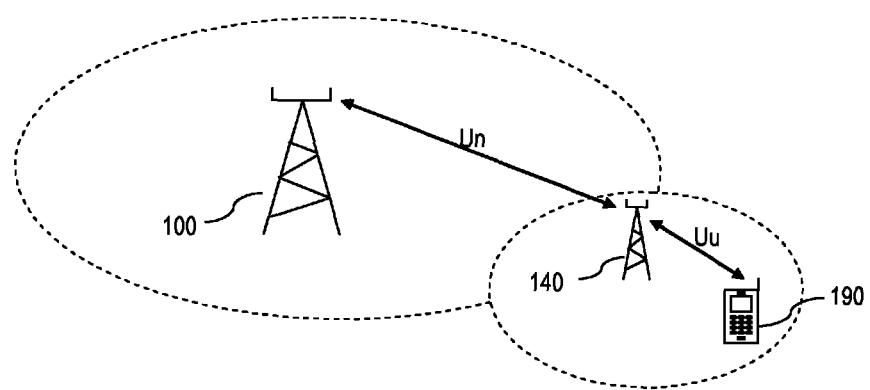
FIG. 1a is a schematic illustration of a wireless communication network comprising a relay node.
Figure 1B:
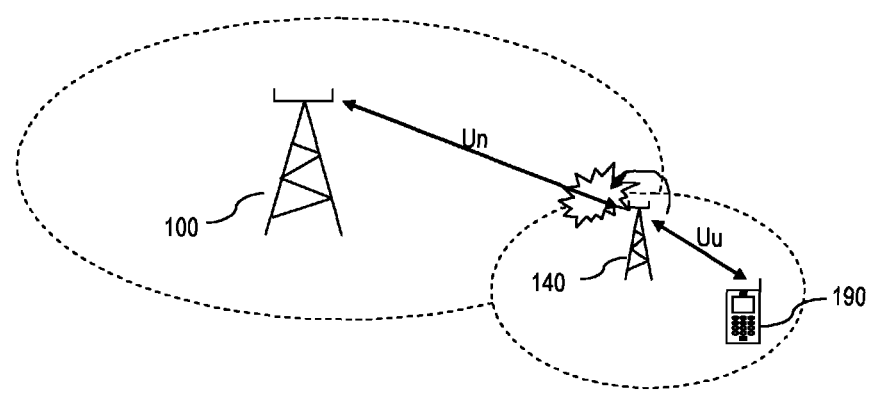
FIG. 1b is a schematic illustration of a wireless communication network comprising a relay node when a self interference occurs.

According to the embodiment illustrated in FIG. 1b, the method in the relay node further comprises refraining 271 from scheduling transmission to the user equipment on the identified at least one resource block until the requested first data has been successfully received in a retransmission from the base station.

In this example, in the case the relay node requests re-transmission, the relay node knows that data from the base station is to be expected. Hence, it refrains from scheduling transmissions in the identified at least one resource block in order to not risk again losing the data from the base station in a re-transmission.

In an example, the method comprises refraining from scheduling transmission to the user equipment on any resource block in a subframe until the requested first data has been successfully received in a retransmission from the base station.

Figure 2C:
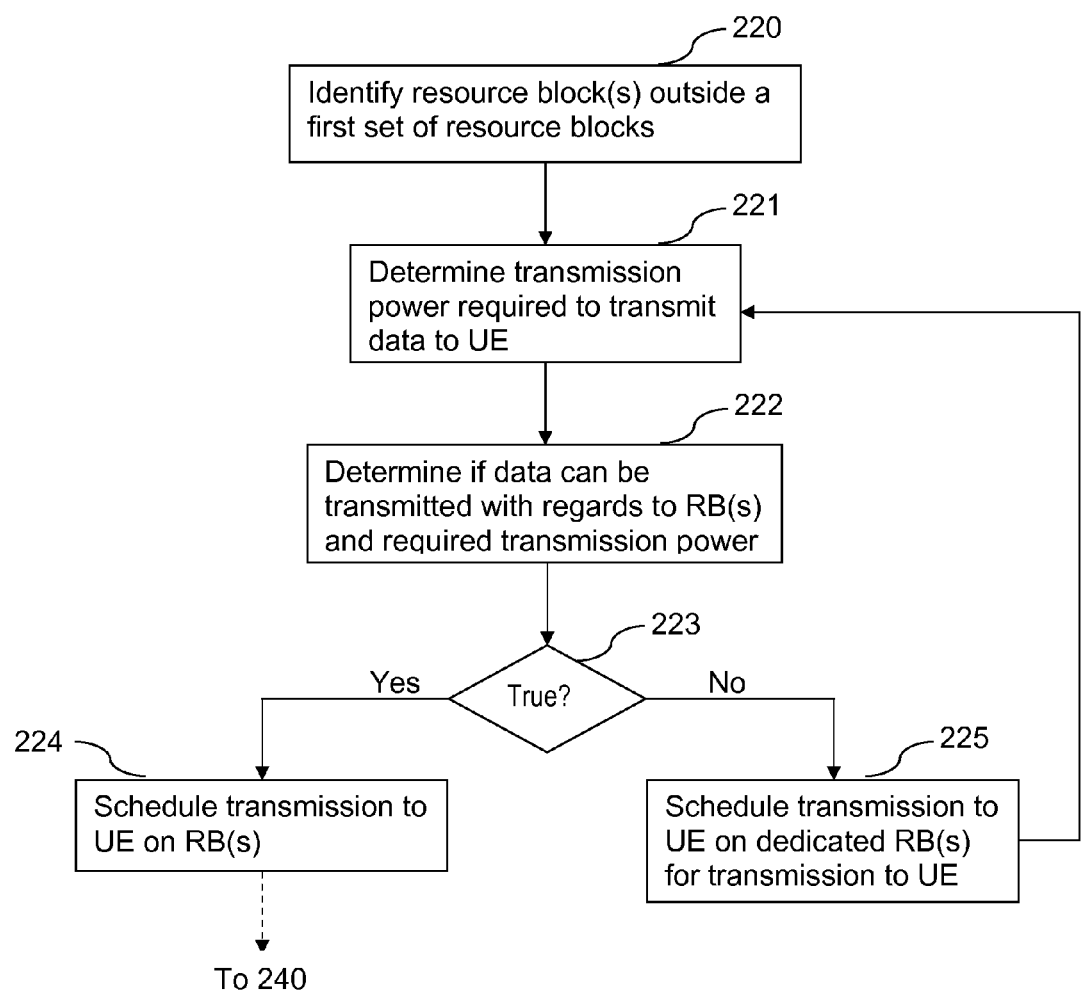
FIG. 2c is a flowchart illustrating still an exemplifying embodiment of a method in a relay node for communicating data to a user equipment.

FIG. 2c is a flowchart illustrating still an exemplifying embodiment of a method in a relay node for communicating data to a user equipment.

According to the embodiment illustrated in FIG. 2c, the method in the relay node further comprises determining 221 a transmission power required to transmit data to the user equipment; and determining 222 if data can be transmitted to the user equipment on the at least one identified resource block using the required transmission power. The method further comprises scheduling 224 transmission to the user equipment if data can be transmitted to the user equipment on the at least one identified resource block using the required transmission power.

Due to nonlinear effects in a transmitter of the relay node, in particular in a power amplifier in the transmitter, spectral leakage into adjacent resource blocks occurs. The leakage, represented as harmonics increases with resource block allocation. The wider bandwidth and the higher transmission power, the larger frequency allocation is affected by the spectral leakage. This will introduce interference to the relay node receiver. In case of too high a transmission power is required for transmission to the user equipment, other resource blocks may be disadvantageously affected. See also FIG. 6, which will be explained in more detail below.

By determining a transmission power required to transmit data to the user equipment; and determining 222 if data may be transmitted to the user equipment on the at least one identified resource block using the required transmission power, before executing the transmission, such spectral leakage may be reduced.

According to an embodiment, a plurality of resource blocks is identified outside the first set of resource blocks. Then the method further comprises scheduling data to be transmitted on the resource blocks having the best channel quality, out of the identified plurality of resource blocks.

By scheduling data to be transmitted on the resource blocks having the best channel quality, out of the identified plurality of resource blocks, the transmission power required may be reduced compared to transmitting data on resource blocks having poor channel quality. This may reduce the spectral leakage.

According to an embodiment, the received information from the base station also indicates a second set of resource blocks of the subframe which are reserved for downlink transmissions from the relay node to the user equipment.

This means that these resource blocks are to be exclusively used by the relay node for downlink transmissions to the user equipment. On these resource blocks, no transmission from the base station to the relay node will occur.

According to still an embodiment, the second set of resource blocks reserved for transmission to the user equipment are located at the edge of a used bandwidth.

According to yet an embodiment, the first set of resource blocks of a subframe reserved for the base station are located adjacent each other.

By having the resource blocks of a subframe reserved for the base station located adjacent each other, the interference between resource block reserved for the base station and resource blocks reserved for the relay node is reduced. Further, by having the resource blocks reserved for the relay node for transmission to the user equipment located at the edge of a used bandwidth, two consecutive subframes will cause minimum interference with each other as the resource blocks at the edge of each subframe are reserved for the relay node for transmission to the user equipment.

According to still an embodiment, the method further comprises negotiating with the base station to reserve additional resource blocks from the resource blocks reserved for the base station to be available for the relay node to transmit data to the user equipment.

Figure 3:
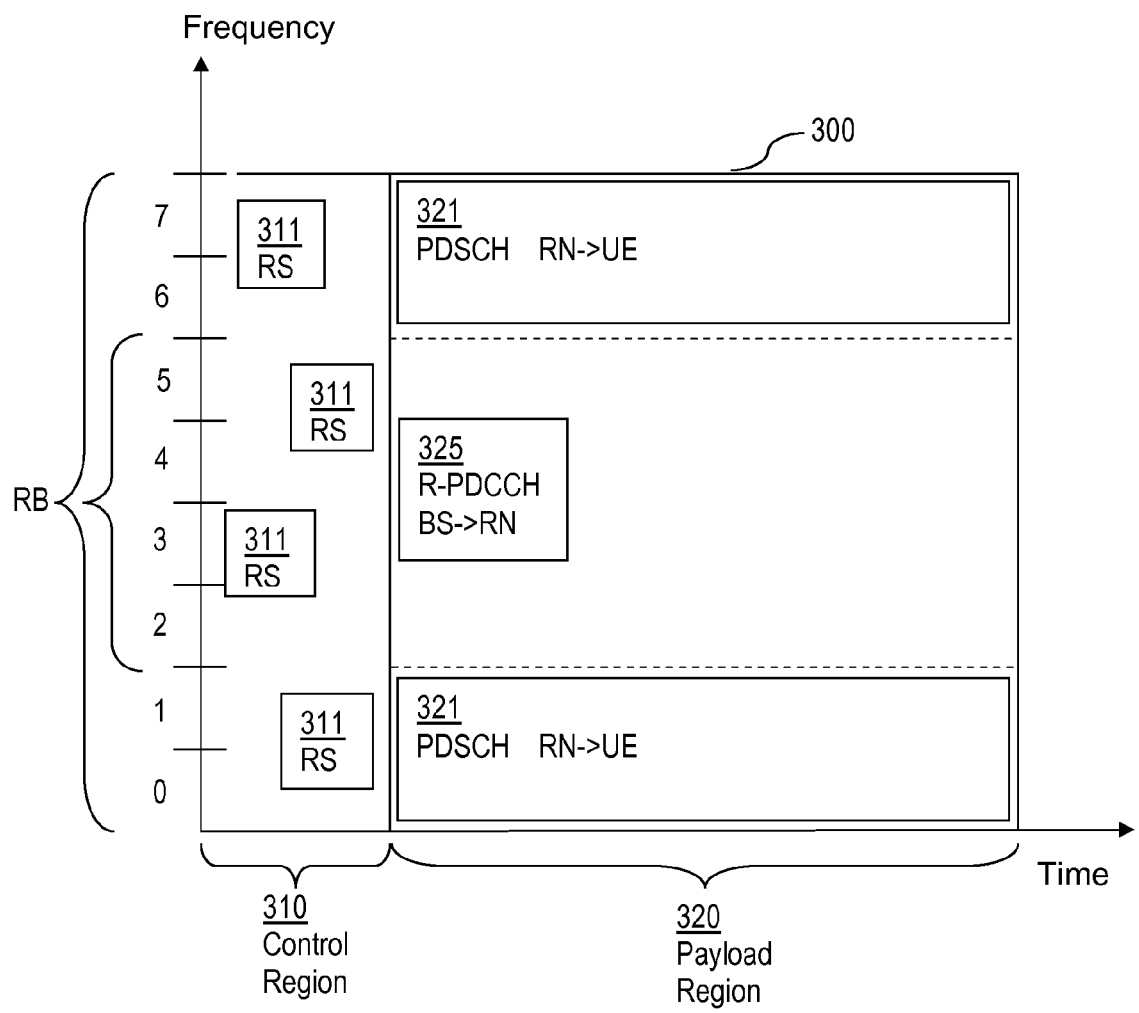
FIG. 3 is a schematic illustration of a subframe for use in communications with the base station, the relay node and the user equipment.

In this embodiment, the relay node negotiates with the base station when the base station performs the configuring of the first set of resource blocks and the second set of resource blocks out of the set of resource blocks in a subframe. Looking briefly at FIG. 3, which will be explained in more detailed below, a subframe 300 comprises a set if eight different resource blocks, 0-7 . In FIG. 3, resource blocks 0, 1, 6 and 7 belong to the second set of resource blocks reserved for the relay node and resource blocks 2-5 belong to the first set of resource blocks reserved for the base station. The negotiation comprises reserving more resource blocks of the eight resource blocks to be reserved for the relay node.

According to yet an embodiment, the relay node, the base station and user equipment are used in a Long Term Evolution, LTE communication system and transmission from the base station are received on a Un interface and transmission to the user equipment carrying data are sent on a Uu interface.

In the case of the method being performed in a relay node in an LTE communication system, the relay node needs to monitor the Un control channel (R-PDCCH), which means that the relay node may determine what resource blocks the relay node should not use to schedule a terminal, due to risk of spectral leakage leaking into the receiver and the resource blocks used for R-PDCCH transmission. In an example, the reserved resource blocks are derived from the potential location of the R-PDCCH within the subframe bandwidth (also referred to as R-PDCCH search space), which is known beforehand by the relay node via higher layer signalling.

In the example of LTE, the above described negotiation with the base station, i.e. DeNB in LTE, for reserving more resource blocks to be used by the remote node is performed using higher layer signalling, e.g. Radio Resource Control (RRC) or Operation, Administration and Maintenance (OAM). The resource blocks indicated by higher layers could include the resource blocks potentially used for R-PDCCH or the DeNB reserves resource blocks in addition to resource blocks potentially used for R-PDCCH. By potentially used is meant that they are used if the DeNB has data to send to the relay node; and if the DeNB have no or only little data to transmit to the relay node, one or more resource blocks may potentially be used for R-PDCCH and may potentially not be used for R-PDCCH. Furthermore, the resource blocks indicated by higher layers could include the resource blocks reserved due to spectral leakage. In an example, adjacent resource blocks are reserved and additional resource blocks are adjacent to the resource blocks used for R-PDCCH. Further, in an example as described above, resource blocks at the edge of the bandwidth are reserved such that the reception of backhaul transmissions is self-interfered only from one side.

FIG. 3 is a schematic illustration of an exemplified subframe for use in communications with the base station, the relay node and the user equipment.

In the figure, the exemplified subframe 300 is represented as a graph having time in the x-axis and frequency on the y-axis. With regards to the frequency bandwidth of the subframe 300, it is divided into eight resource blocks (RB) ranging from resource block 0 to resource block 7. In the time domain, the subframe comprises two regions or parts. A control region 310 corresponding to PDCCH comprises reference symbols (RS) 311. The subframe also has a payload region 320, in which a first set 325 of resource blocks out of the eight resource blocks in the subframe are reserved for the base station or eNB and they are illustrated as resource blocks number 2 to 5. The second set 321 of resource blocks in the subframe 300 reserved for the relay node are illustrated as resource blocks 0, 1, 6 and 7. FIG. 3 also illustrates the first set 325 of resource blocks being located adjacent each other and the second set 321 of resource blocks in the subframe 300 being located at the ends of the bandwidth of the subframe. It shall be pointed out that this is merely an exemplified subframe. Another exemplified subframe (not illustrated in any figure) has resource blocks 0-3 reserved for the base station and resource blocks 4-7 reserved for the relay node. In this exemplified subframe, the first set of resource blocks are located adjacent each other and the second set of resource blocks in the subframe are located at one end of the bandwidth of the subframe.

The "allowed area", i.e. the resource blocks reserved for the DeNB is in an example a function of the transmission power as well as the number of allocated resource blocks. Alternatively, in another example, the size of the area is signalled by higher layers, e.g. after a negotiation between the DeNB and the relay node. Hence the relay node might have a large allowed scheduling area, i.e. resource blocks, to user equipments being located close to the relay node (i.e., when the required transmission power from the relay node is low) that only require low data rates (small bandwidth allocations) compared to user equipments being located far away from the relay node, requiring high data rates (large bandwidth allocations).

Further, in the example of LTE, receiving 210 information from the base station, i.e. eNB indicating a first set of resource blocks of a subframe comprising control information comprises receiving information about resource blocks used for R-PDCCH monitoring. This information is received during for instance connection setup between relay node and DeNB via higher layer (RRC) signalling. The step of identifying 220, from the control information, at least one resource block out of the first set of resource blocks, reserved for the base station, comprises the relay node determining resource blocks that may be allowed for downlink scheduling over the Uu interface.

The information may be stored for instance in a look up table in a memory in the relay node, which a processing unit in the relay node may use to check what data need to be scheduled to a certain UE and hence knowledge of transmission power and resource block allocation. Then data is scheduled to the user equipments connected to the relay node using the "allowed" resource blocks.

Still further in the example of LTE, the step of determining 260 from the control information that first data was received in the transmission from the base station on the identified at least one resource block, and that second data was transmitted simultaneously to the user equipment on the identified at least one resource block, comprises reading (step 250 in FIG. 2*a*) or decoding the R-PDCCH and from the decoded R-PDCCH determine that user data was sent on resource blocks the relay node used for scheduling the user equipment. This detection may only be made once the R-PDCCH is decoded, and then the Uu transmission has already taken place and hence the relay node may not, due to interference, be able to decode the Un data.

The principle of the method described above may be applied to uplink backhaul subframes as well. By means of higher layer signaling, the donor eNB is able to indicate resources, which are most probably used/scheduled for Un traffic. In turns, the relay node is able to schedule its own user equipments on the remaining resource blocks. If, nonetheless, scheduled Uu and Un transmission collide, the relay node is able to decide whether to prioritize and receive Uu data or whether to prioritize and transmit Un data.

Like described above, from an interference perspective it may be advantageous that resource blocks at the edge of the bandwidth are reserved for Un. However, in uplink subframes it is likely that user equipments transmit Physical Uplink Control Channel (PUCCH) on resources, which are at the edge of the bandwidth. Hence, in uplink subframes it is preferred that adjacent resource blocks are reserved in the inner part of the bandwidth, which respect the potential PUCCH resources. However, PUCCH transmissions on Un would also utilize PUCCH resources at the edge of the bandwidth, which very likely self-interfere with Uu PUCCH reception at the relay node. In order to overcome that limitation, the donor eNB is in one example adapted to always allocate PUSCH resources by means of an uplink grant, even if there is no uplink data at the relay node, such that any uplink control information (UCI) is transmitted on PUSCH instead of on PUCCH.

Embodiments herein also relate to a relay node adapted to communicate data to a user equipment, the relay node being associated with a base station. Exemplifying embodiments of such a relay node will now be described with reference to the block diagram in FIG. 5*a*. The exemplifying embodiments of the relay node have the same objects and advantages as the method performed therein, which is described above. The relay node will only be described in brief in order to avoid unnecessary repetition.

According to an exemplifying embodiment of a relay node 140, 540 adapted to communicate data to a user equipment 190, 590, the relay node being associated with a base station 100, 500, the relay node 140, 540 is adapted to receive information from the base station 100, 500 indicating a first set of resource blocks of a subframe comprising control information. The relay node 140, 540 is also adapted to identify, based on the received information, at least one resource block outside the first set of resource blocks; and to schedule, to the user equipment 190, 590, transmissions on the at least one identified resource block.

According to an embodiment, the relay node 140, 540 is adapted to receive a transmission from the base station 100, 500 comprising control information; and to determine from the control information whether a first data was received in the transmission from the base station 100, 500 on the identified at least one resource block, and if second data was transmitted simultaneously to the user equipment 190, 590 on the identified at least one resource block. The relay node 140, 540 is further adapted to request retransmission from the base station 200, 500 of the first data.

According to still an embodiment, the relay node 140, 540 is further adapted to refrain from scheduling transmission to the user equipment 190, 590 on the identified at least one resource block, until the requested first data has been successfully received in a retransmission from the base station 200, 500.

In an example, the relay node 140, 540 is adapted to refrain from scheduling transmission to the user equipment 190, 590 on any resource block in a subframe until the requested first data has been successfully received in a retransmission from the base station 200, 500.

According to yet an embodiment, the relay node 140, 540 is further adapted to determine a transmission power required to transmit data to the user equipment 190, 590; and to determine if data can be transmitted to the user equipment 190, 590 on the at least one identified resource block using the required transmission power. The relay node 140, 540 is further adapted to schedule transmission to the user equipment 190, 590 if data can be transmitted to the user equipment 190, 590 on the at least one identified resource block using the required transmission power.

According to still an embodiment, the relay node 140, 540 is further adapted to identify a plurality of resource blocks outside the first set of resource blocks; and to schedule data to be transmitted on the resource blocks having the best channel quality, out of the identified plurality of resource blocks.

According to an embodiment, the received information from the base station 100, 500 also indicates a second set of resource blocks of the subframe which are reserved for downlink transmissions from the relay node 140, 540 to the user equipment 190, 590.

According to yet an embodiment, the second set of resource blocks reserved for transmission to the user equipment 190, 590 are located at the edge of a used bandwidth.

According to an embodiment, the first set of resource blocks of a subframe reserved for the base station 100, 500 are located adjacent each other.

According to still an embodiment, the relay node 140, 540 is further adapted to negotiate with the base station 100, 500 to reserve additional resource blocks from the resource blocks reserved for the base station 200, 500 to be available for the relay node 140, 540 to transmit data to the user equipment 190, 590.

In yet an embodiment, the relay node 140, 540, the base station 100, 500 and the user equipment 190, 590 are used in a Long Term Evolution, LTE communication system and transmission from the base station 100, 500 potentially carrying data are received on a Un interface and transmission to the user equipment 190, 590 carrying data are sent on a Uu interface.

Embodiment herein also relate to a method in a base station associated with a relay node, for controlling resource reservation of the relay node. Such a method will now described with reference to the flowchart in FIG. 4.

Figure 4:
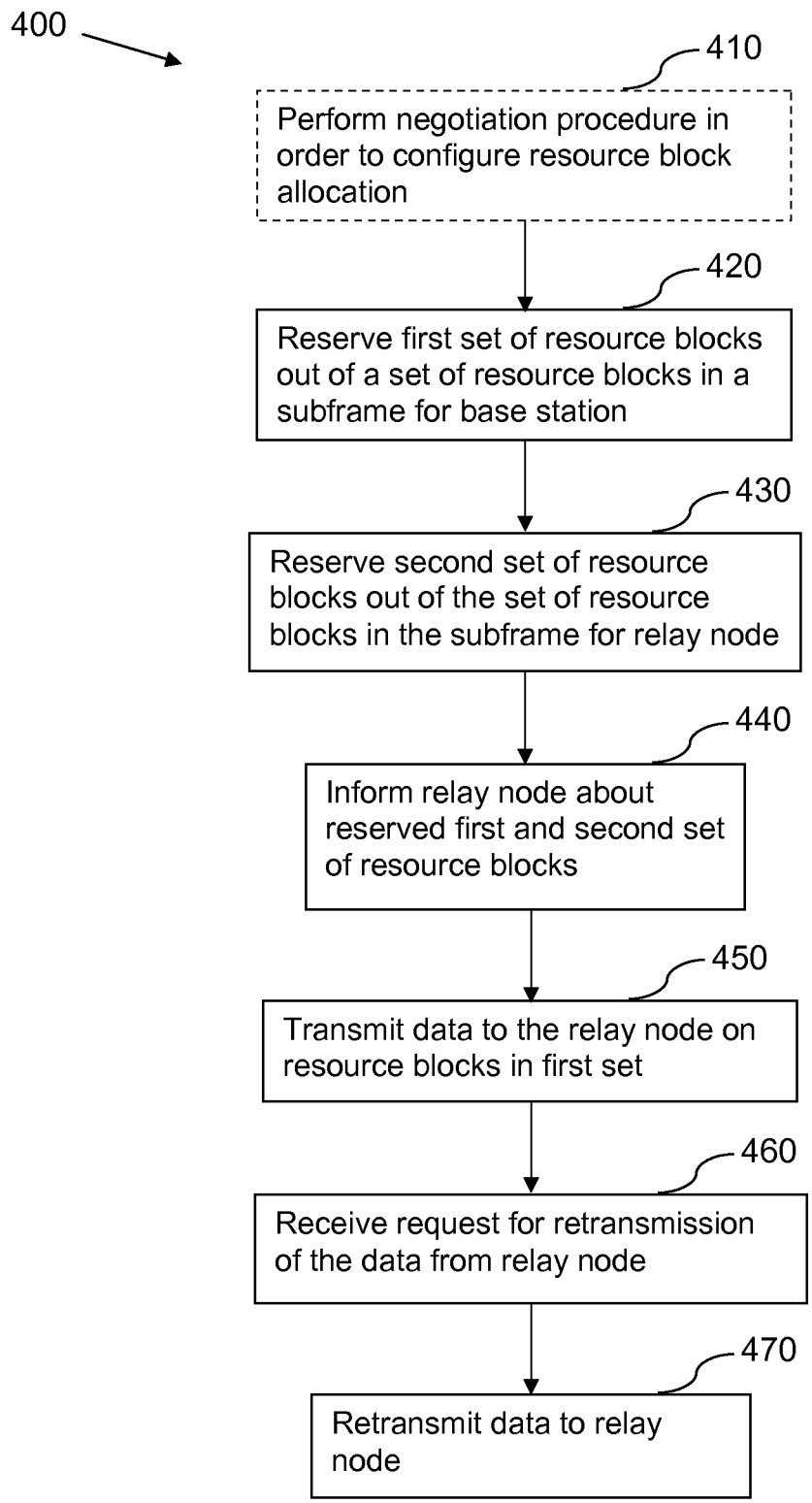
FIG. 4 is a flowchart illustrating an exemplifying embodiment of a method in a base station for controlling resource reservation of a relay node.

FIG. 4 illustrates an exemplifying embodiment of the method 400 comprising reserving 420 a first set of resource blocks out of a set of resource blocks in a subframe, to transmit data to the relay node, and reserving 430 a second set of resource blocks out of the set of resource blocks in the subframe, for enabling the relay node to schedule transmissions to a user equipment being served by the relay node. The method further comprises informing 440 the relay node about the reserved first and second set of resource blocks.

According to an embodiment, the method 400 further comprises transmitting 450 data to the relay node on the resource blocks reserved for the base station to transmit data to the relay node, and receiving 460 a request for retransmission of the data from the relay node. The method further comprises retransmitting 470 the data to the relay node on the resource blocks reserved for the base station to transmit data to the relay node.

In an example, the method further comprises performing 410 a negotiation procedure in order to configure resource block allocation with regards to the number of resource blocks to be reserved for the base station and the number of resource blocks to be reserved for the relay node.

In the example of LTE, the above described negotiation procedure in order to configure resource block allocation, is performed using higher layer signalling, e.g. RRC or OAM.

Embodiments herein also relate to a base station associated with a relay node, which base station is adapted to control resource reservation of the relay node, Exemplifying embodiments of such a base station will now be described with reference to the block diagram in FIG. 5b. The exemplifying embodiments of the base station have the same objects and advantages as the method performed therein, which is described above. The base station will only be described in brief in order to avoid unnecessary repetition.

According to an exemplifying embodiment of such a base station 100, 500, the base station is adapted to reserve a first set of resource blocks out of a set of resource blocks in a subframe for transmission of data to the relay node 140, 540; and to reserve a second set of resource blocks out of the set of resource blocks in the subframe for enabling the relay node 140, 540 to schedule transmissions to a user equipment 190, 590 being served by the relay node 140, 540. The base station 100, 500 is further adapted to inform the relay node 140, 540 about the reserved first and second set of resource blocks.

According to an embodiment, the base station 100, 500 is further adapted to transmit data to the relay node on the resource blocks reserved for the base station 100, 500 to transmit data to the relay node 400, 540; and to receive a request for retransmission of the data from the relay node 140, 540. The base station 100, 500 is also adapted to retransmit the data to the relay node 140, 540 on the resource blocks reserved for the base station 100, 500 to transmit data to the relay node 140, 540.

In an example, the base station 100, 500 is further adapted to perform a negotiation procedure in order to configure resource block allocation with regards to the number of resource blocks to be reserved for the base station and the number of resource blocks to be reserved for the relay node.

Figure 6:
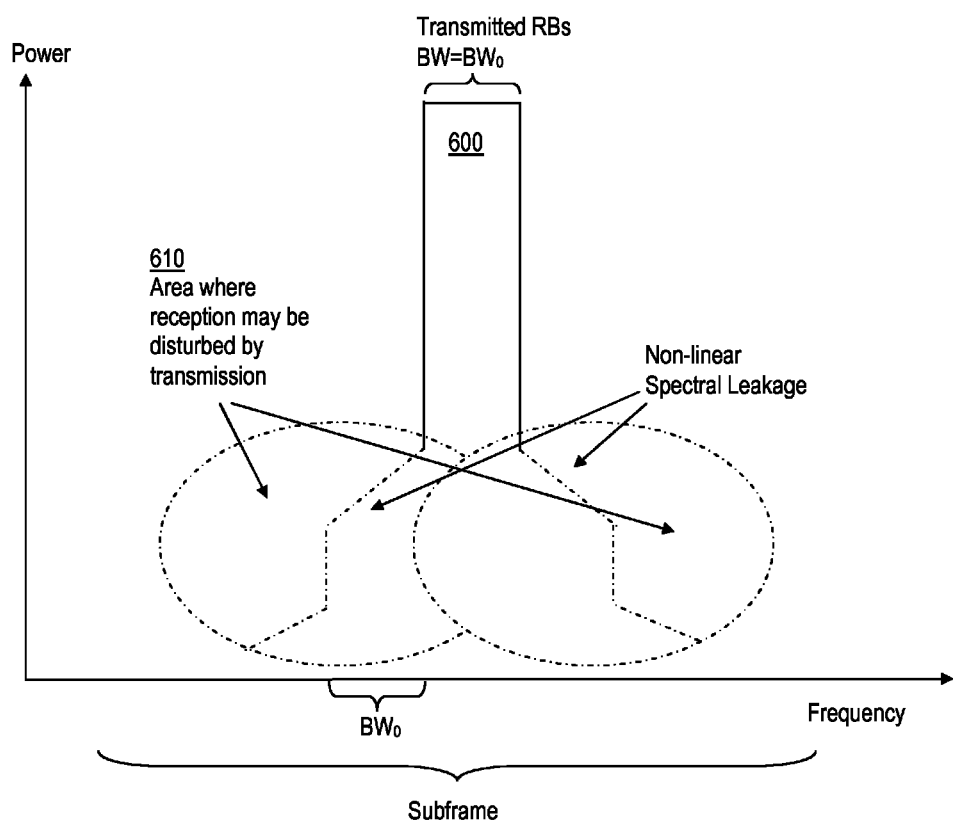
FIG. 6 is an illustration of an example of spectral leakage of a resource block in a relay node.

FIG. 6 is an exemplifying illustration of spectral leakage of a resource block in the relay node. It is illustrated in a graph, where the x-axis represents the bandwidth and the y-axis represents a transmission power. A resource block 600 is transmitted at a certain transmission power from the relay node to a user equipment. It has a bandwidth of $BW_0$. As can be seen in the figure, the resource block leaks into both the preceding and the subsequent resource blocks in a subframe. FIG. 6 illustrates the leakage being stronger in the preceding and the subsequent resource blocks, but some leakage may occur also beyond the preceding and the subsequent resource blocks. FIG. 6 further illustrates two areas 610 in which the reception on adjacent resource blocks may be disturbed or self-interfered by the transmission of the resource block 600.

Figure 5A:
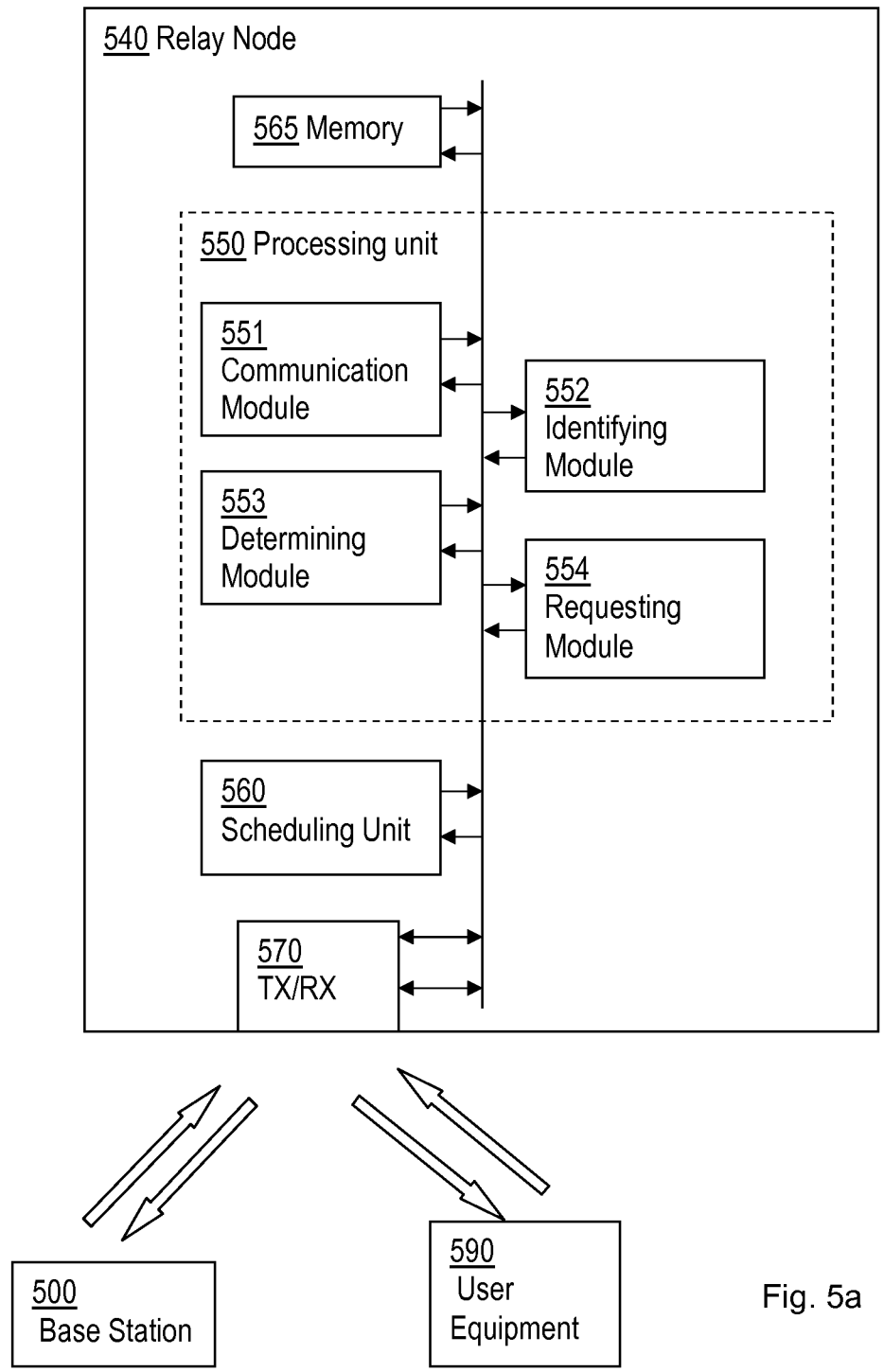
FIG. 5a is a block diagram illustrating an embodiment of a base station.
Figure 5B:
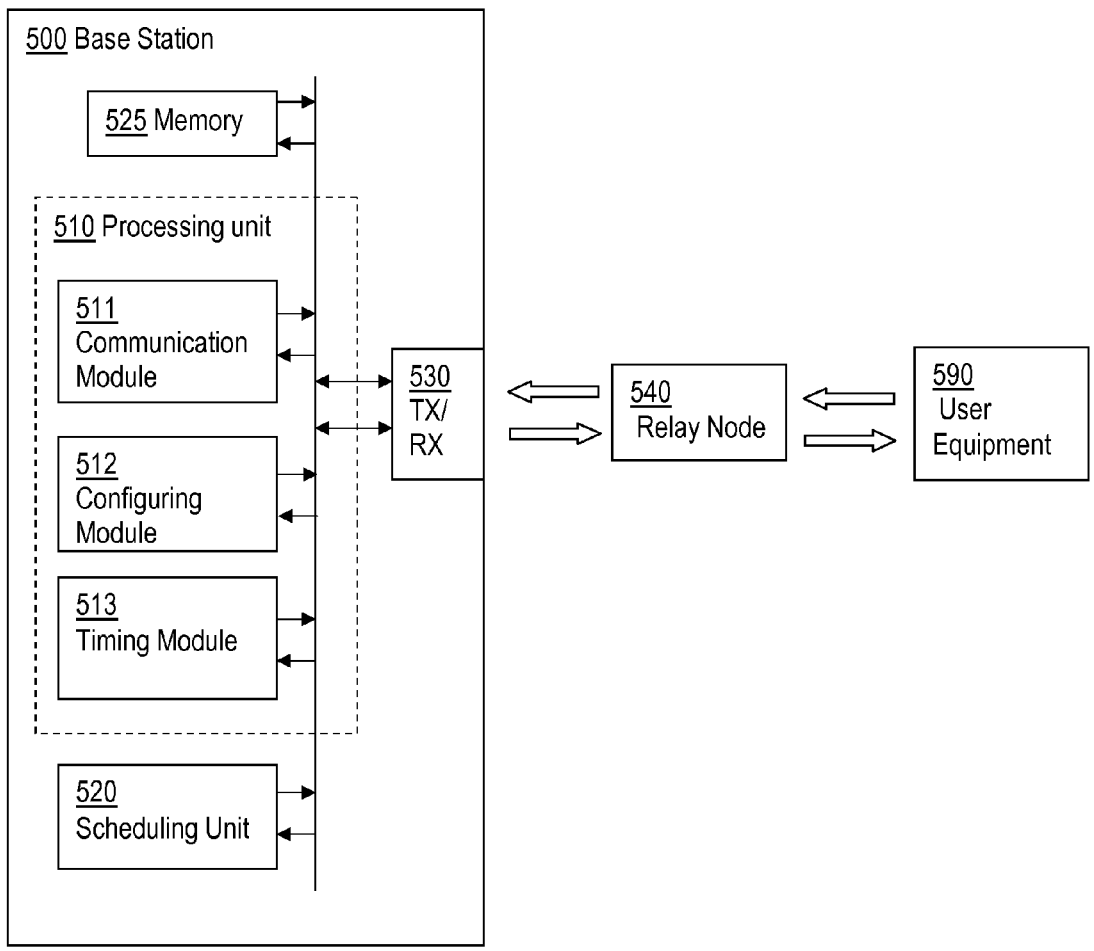
FIG. 5b is a block diagram illustrating an embodiment of a relay node.

It should be noted that FIGS. 5a and 5b merely illustrate various functional units and modules in the relay node and in the base station in a logical sense. The functions in practice may be implemented using any suitable software and hardware means/circuits etc. Thus, the embodiments are generally not limited to the shown structures of the relay node and the base station and the functional units and modules. Hence, the previously described exemplary embodiments may be realised in many ways. For example, one embodiment includes a computer-readable medium having instructions stored thereon that are executable by the respective processing units 550, 510 for executing the method in the respective relay node and base station. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a relay node for communicating data to a user equipment, said relay node being associated with a base station, the method comprising:
   receiving information from the base station indicating a first set of resource blocks of a subframe comprising control information;
   identifying, based on the received information, at least one resource block outside said first set of resource blocks;
   scheduling to the user equipment transmissions on said at least one identified resource block;
   receiving a transmission from the base station comprising control information;
   determining from said control information in the received transmission whether a first data was received in the transmission from the base station on said identified at least one resource block, and if a second data was transmitted simultaneously to said user equipment on the identified at least one resource block; and requesting retransmission from the base station of said first data.

2. The method according to claim 1, further comprising refraining from scheduling transmission to the user equipment on said identified at least one resource block until the requested first data has been successfully received in a retransmission from the base station.

3. The method according to claim 1, further comprising:
determining a transmission power required to transmit data to said user equipment;
determining if data can be transmitted to said user equipment on the at least one identified resource block using the required transmission power; and
scheduling transmission to said user equipment if data can be transmitted to said user equipment on the at least one identified resource block using the required transmission power.

4. The method according to claim 1, wherein a plurality of resource blocks are identified outside said first set of resource blocks; and
the method further comprising scheduling data to be transmitted on the resource blocks having the best channel quality, out of said identified plurality of resource blocks.

5. The method according to claim 4, wherein said second set of resource blocks reserved for transmission to the user equipment are located at the edge of a used bandwidth.

6. The method according to claim 1, wherein said received information from the base station also indicates a second set of resource blocks of said subframe which are reserved for downlink transmissions from said relay node to said user equipment.

7. The method according to claim 1, wherein said first set of resource blocks of a subframe reserved for the base station are located adjacent each other.

8. The method according to claim 1, further comprising negotiating with the base station to reserve additional resource blocks from said identified at least one resource block that is reserved for the base station to be available for the relay node to transmit data to the user equipment.

9. The method according to claim 1, wherein said relay node, base station and user equipment are used in a Long Term Evolution, LTE communication system and transmission from said base station are received on a Un interface and transmission to said user equipment carrying data are sent on a Uu interface.

10. A relay node configured to communicate data to a user equipment, the relay node being associated with a base station, the relay node including a processing unit and a memory, the memory containing instructions that, when executed by the processing unit, configure the processing unit to:
receive information from the base station indicating a first set of resource blocks of a subframe comprising control information;
identify, based on said received information, at least one resource block outside said first set of resource blocks;
schedule, to the user equipment, transmissions on said at identified least one identified resource block;
receive a transmission from the base station comprising control information;
determine from said control information in the received transmission whether a first data was received in said transmission from the base station on said identified at least one resource block, and if second data was transmitted simultaneously to the user equipment on said identified at least one resource block; and
request retransmission from the base station of said first data.

11. The relay node (140, 540) according to claim 10, wherein the memory includes further instructions that, when executed by the processing unit, configure the processing unit to refrain from scheduling transmission to the user equipment on said identified at least one resource block until said requested first data has been successfully received in a retransmission from the base station.

12. The relay node according to claim 10, wherein the memory includes further instructions that, when executed by the processing unit, configure the processing unit to:
determine a transmission power required to transmit data to the user equipment;
determine if data can be transmitted to the user equipment on said at least one identified resource block using said required transmission power; and
schedule transmission to the user equipment if data can be transmitted to the user equipment on said at least one identified resource block using said required transmission power.

13. The relay node according to claim 10, wherein the memory includes further instructions that, when executed by the processing unit, configure the processing unit to identify a plurality of resource blocks outside said first set of resource blocks, and to schedule data to be transmitted on the resource blocks having the best channel quality, out of said identified plurality of resource blocks.

14. The relay node according to claim 10, wherein said received information from the base station also indicates a second set of resource blocks of said subframe which are reserved for downlink transmissions from the relay node to the user equipment.

15. The relay node according to claim 10, wherein said second set of resource blocks reserved for transmission to the user equipment are located at the edge of a used bandwidth.

16. The relay node according to claim 10, wherein said first set of resource blocks of a subframe reserved for the base station are located adjacent each other.

17. The relay node according to claim 10, wherein the memory includes further instructions that, when executed by the processing unit, configure the processing unit to negotiate with said base station to reserve additional resource blocks from said identified at least one resource block that is reserved for the base station to be available for the relay node to transmit data to the user equipment.

18. The relay node according to claim 10, wherein said relay node, base station and user equipment are used in a Long Term Evolution, LTE communication system and transmission from said base station potentially carrying data are received on a Un interface and transmission to said user equipment carrying data are sent on a Uu interface.

* * * * *